Figure 2:
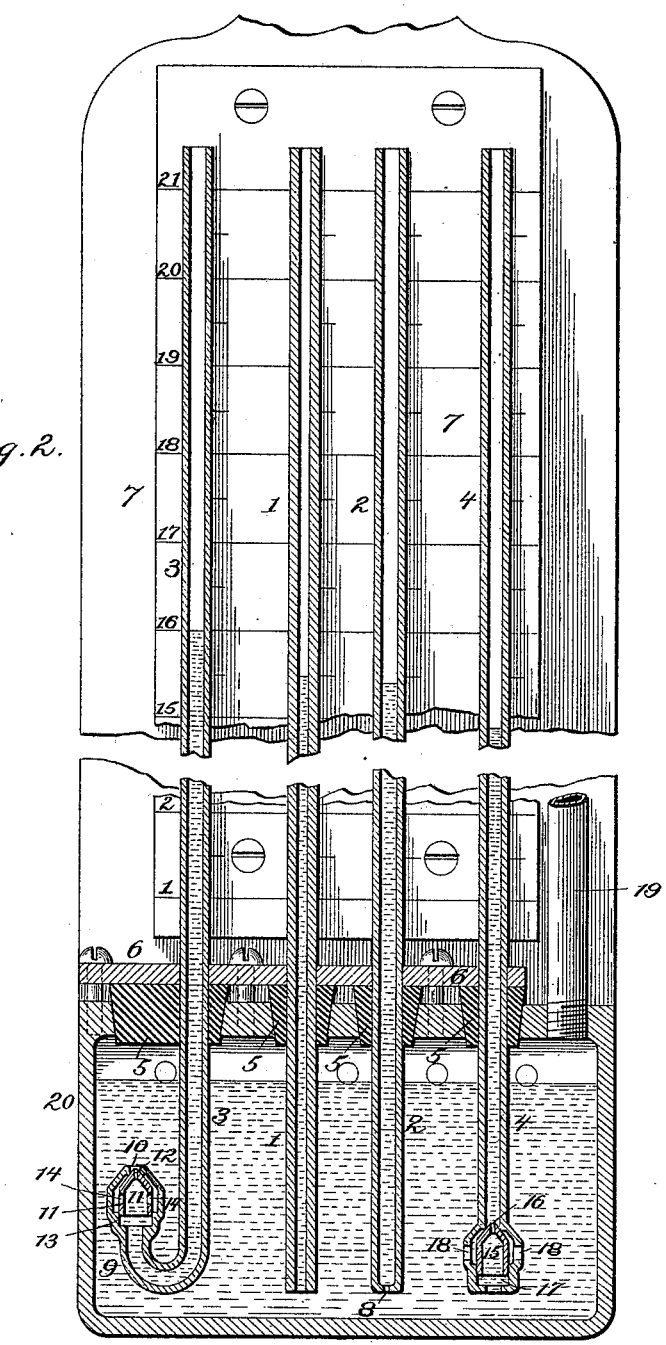

(No Model.) 2 Sheets—Sheet 1.
E. A. UEHLING.
PRESSURE GAGE.
No. 552,678. Patented Jan. 7, 1896.
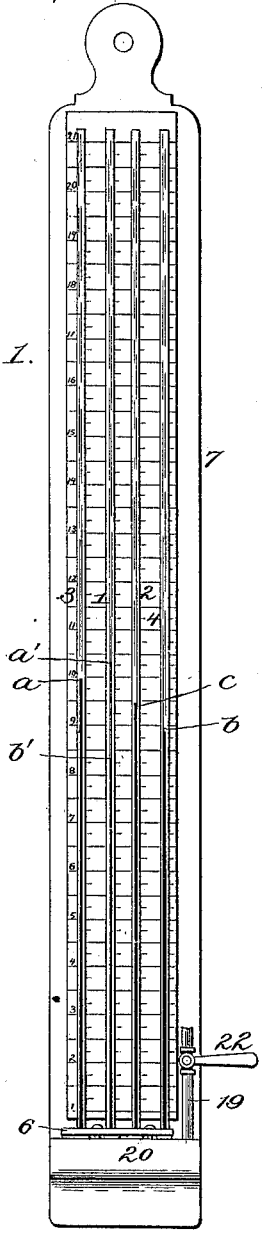
Fig. 1.
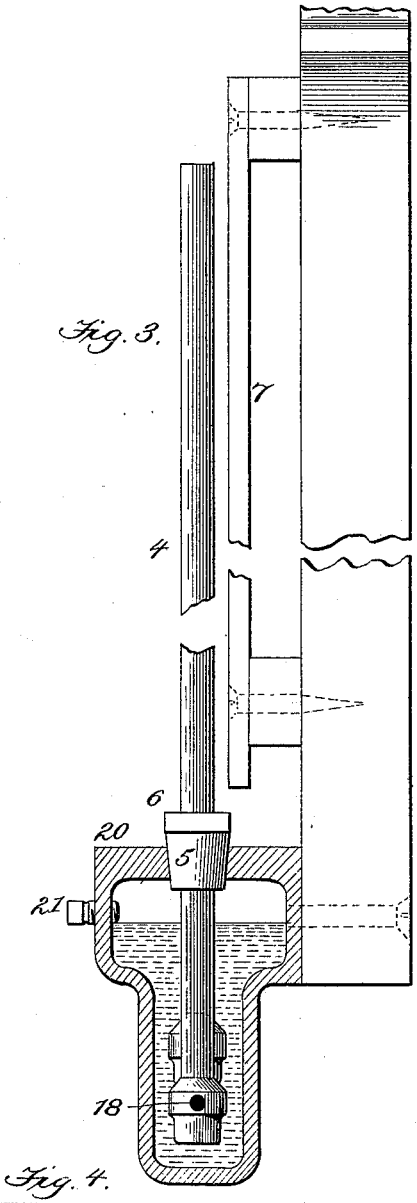
Fig. 3.
Fig. 4.
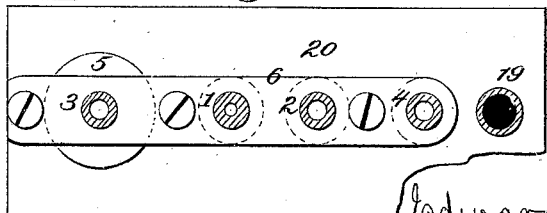
WITNESSES:
Edwin L. Bradford
D. N. Naylor
INVENTOR
Edward A. Uehling
BY
Johnson & Johnson
ATTORNEYS.

(No Model.) 2 Sheets—Sheet 2.

E. A. UEHLING.
PRESSURE GAGE.

No. 552,678. Patented Jan. 7, 1896.

WITNESSES:
Edwin L. Bradford
D. H. Naylor

INVENTOR
Edward A. Uehling
BY Johnson & Johnson
ATTORNEYS.

UNITED STATES PATENT OFFICE.

EDWARD A. UEHLING, OF BIRMINGHAM, ALABAMA.

PRESSURE-GAGE.

SPECIFICATION forming part of Letters Patent No. 552,678, dated January 7, 1896.

Application filed October 3, 1894. Serial No. 524,800. (No model.)

*To all whom it may concern:*

Be it known that I, EDWARD A. UEHLING, a citizen of the United States, residing at Birmingham, in the county of Jefferson and State of Alabama, have invented a new and useful Manometer or Pressure-Gage, of which the following is a specification.

My invention relates to that type of pressure-gages in which a column of liquid confined within a tube is used to indicate the pressure. Gages of this type when throttled to make them steady are very slow to respond to the changes of pressure which they are supposed to indicate; or if such gages are of delicate action and respond quickly are very unsteady in their action. In cases where the pressure varies by frequent and regular impulses, as is always the case with reciprocating compressors or blowing-engines, it is often impossible to read off the real pressure that is supposed to be or should be indicated. The column of liquid often varies within limits considerably above and below the actual variation of pressure, and this excess of "dancing" of the liquid column is caused by the momentum of the moving parts, and from this cause it is often impossible to say just what the pressure is. To avoid this difficulty and to enable the observer to read off accurately not only the mean average pressure but also the maximum, the minimum and the variations of pressures, as well as to observe the pulsations themselves, is the object of my invention. The submerging of the pressure-communicating ends of all the gage-tubes in the liquid renders the indication of the pressure in all the tubes simultaneous and gives the same pressure to all the tubes alike, indicating at once and with precision the pulsations to which the pressure may be subjected, the mean average, the maximum and the minimum pressures under all the conditions of the source of pressure. The submerging of the valves contained in the tubes, which indicate the average, maximum and the minimum pressures, relieves the valves of sudden and jumping movements and renders the indications in the tubes steady and reliable. This submerging of the valves also causes them to be opened and closed by the flow of the liquid and keeps them lubricated and sensitive to the pressure. To obtain this sensitive action in closing the valve it is important that it shall be hollow and stand with its open lower or receiving end down so that it will offer a large interior surface into which the liquid is instantly forced to lift and close the valve. The receiving end of the valve must therefore be unobstructed in the tube 4 to allow the free inflow of the liquid from the reservoir into the hollow valve to close it, and in the tube 3 to allow the free flow from said tube into said valve to close it.

Referring to the interdependence of action between the tubes to obtain a visible showing of the results of all the tubes, as a unitary thing, it is evident that there is a unity of action between them which results in the visible exposition of the dynamic condition of the blast or other medium of pressure. The combination shown by this condition makes, as it were, a complete analysis of the state of the pressure and unites the result in one picture. Each tube picks out an element of pressure, one the maximum, another the minimum, the third the mean, and the fourth the pulsations of pressure. All four tubes unite to produce this result, and this result gives information that is of the highest importance in determining the precise condition of the medium of pressure by a combination that is in itself a unit.

For carrying out these objects and for effecting the results stated, I have produced the manometer illustrated in the accompanying drawings, but it will be understood that my invention is not limited to any particular way of arranging or grouping, or mounting the several tubes as an entirety or separately for use and connection with the source of pressure.

Referring to the drawings, Figure 1 shows in front view my new manometer. Fig. 2 shows the manometer with its group of tubes and reservoir in vertical section. Fig. 3 is a section of the same taken at right angles to the line of section of Fig. 1, and Fig. 4 is a top view.

The indicating-tubes are mounted in a reservoir 20 with their lower ends immersed in the indicating liquid, and I prefer to construct the upper part of the reservoir with a large superficial area for the indicating liquid and a comparatively small cubic contents for the purpose of reducing the variations caused by the liquid entering the tubes to a minimum, and also to reduce the quantity of liquid required as much as possible. For this purpose I make the upper portion of the body of the reservoir of greater lateral area to give greater width of surface to the liquid, with a comparatively narrow body at the bottom of the reservoir, and it will be understood that the pressure is communicated to the surface of the liquid within the reservoir by a pipe 19, which, of course, connects with the source of pressure and is controlled by a valve 22.

As shown, I use a group of four tubes 1, 2, 3, 4 and mount them vertically in the reservoir, each by a separate cork or plug 5, preferably of rubber, set in taper holes in the top of the reservoir and clamped down by a plate 6, by means of screws, making a very simple and effective air-tight joint for the tubes. This construction also gives the advantage of providing means for suspending the tubes with their ends submerged within the liquid in the reservoir, by the clamping function of the cap-plate upon the plugs, which latter being compressed in their seats by the cap-plate, are thereby bound upon the tubes and hold them in their operative relation to the indicating liquid and to the graduated index-plate. A suitable graduated index-plate 7 is placed back of the group of tubes. The tube 1 is the ordinary manometer tube, having a uniform bore from top to bottom, and hence indicates freely all the pulsations to which the source of pressure may be subjected. The tube 2 has the inlet-opening 8 in its immersed end, very small in proportion to its bore, the result of which causes the liquid to flow into and out of said tube very slowly, and hence the pulsations effect the elevation of the column but slightly, and therefore this tube continually indicates the mean average pressure. This tube has a greater bore than tube 1 for a purpose which I shall presently state. Tube 3 has a return-bend 9 so as to open upward, and its inlet-opening 10 is controlled by a check-valve 11 adapted to operate so as to allow free ingress of the liquid, but retards its egress, whereby the column of liquid is raised therein to the full height of the maximum pressure of each pulsation, but can only fall very slightly in the intervals between the impulses, and must necessarily stand very steadily at the average maximum pressure of the pulsations. This check-valve I prefer to place within the end of the tube, and to make its acting end conical to coact with the inner conical walls which bound the opening 10 in the tube. The valve is hollow and is open at its lower end, while its upper conical end is provided with an opening 12 of less area than the tube-opening 10, into which the conical end of the valve closes to cut off the flow into the tube. The valve rises and falls in a seat 13 in the tube, and the latter, above the seat, is enlarged to form a space between its inner walls and the valve, the walls of which are provided with openings 14, through which the liquid is permitted to flow into the hollow valve and thence into the tube, when the valve is open and resting upon its seat. In this position of the valve its conical end will be caused to uncover the tube-opening 10 so that the inflow will be over the conical end of the valve, through its side openings to its interior and down through its open end into the tube. The outflow of the indicating liquid automatically lifts the valve and holds its conical end closed with the tube to prevent the flow outside of the valve, and confine such flow to the interior of the valve through its small opening 12, which is the position of the valve shown in the drawings. In the open position of the valve the inflow into the tube will be through the tube-opening 10 and also through the apex-opening of the valve; while in the closed position of the valve the outflow can only be through its apex-opening. Tube 4 is also provided with a check-valve 15, made hollow and having a conical upper end provided with a small apex-opening 16 therein, the said conical end being to close with the corresponding walls of the tube, and when so closed the inflow into the tube can only be within the valve through this small apex-opening. The lower end of this tube is open and has therein the seat 17 for the valve, and above this seat is enlarged and has side openings 18, so that in the open position of the valve resting upon its seat, the outflow of the liquid from the tube will be outside of the valve and through the side openings of the tube, and also through the minute apex-opening of the valve. This valve, therefore, in its closed position upon its conical seat, allows the liquid to enter the tube only very slowly through the minute apex-opening in the valve, and such inflow holds the valve closed upon its conical seat; but in the open position of this valve upon its lower seat the liquid is allowed to escape very freely from the tube through its side openings 18; while a very slow inflow is permitted through the valve itself by its apex-opening and the open bottom of the tube, so that the latter will empty itself at once to the point of the maximum pressure; but as the tube can fill only very slowly, it is evident it will indicate very steadily the average minimum pressure of the pulsations.

It is important that the operation of the check-valves shall be in reverse relation, so that the outflow of one tube shall be through a minute aperture of such valve, while the inflow of the other tube shall be through an identical aperture of its check-valve, and these valves co-operating with the non-valved tubes, one of which has an inlet-opening identical with the apex-valve apertures, will show at a glance the complete conditions of the pressure indicated. For example, referring to Fig. 1, tube 1 will show the frequency of the pulsations and that they vary somewhere between the maximum $a'$ and the minimum $b'$, between which the column of liquid will "dance." Tube 2 will indicate the mean pressure at *c*, while tubes 3 and 4 respectively indicate the maximum and minimum pressure at *a* and *b*.

The reservoir is provided with a screw-plug 21 through which the liquid is supplied to the proper level.

It is to be understood that changes in the form, proportions, disposition and manner of details as are embraced in the terms of the concluding claims, may be resorted to without departing from the principle or sacrificing any of the advantages of my invention; and, although I have shown all the tubes as communicating with the same reservoir, yet each tube may communicate with a separate reservoir, when used as shown, but in case the pressure to be indicated is below atmospheric pressure the top of the tubes are connected with the source of pressure and the tube 19 is left open to the atmosphere, and each tube can be operated or read by itself if it should be desirable to know only the mean pressure, or only one or the other of the extremes. It will also be understood that all the tubes must be open at their upper ends, when used for pressures greater than the atmosphere. For pressures less than atmospheric the upper ends of the tubes are connected with the source of pressure—*i. e.*, vacuum—and the reservoir communicates with the atmosphere.

What I claim as new, and desire to secure by Letters Patent, is—

1. A manometer or pressure gage, comprising a reservoir for containing the liquid and connected with the pressure to be indicated, a plurality of gage-tubes having differential inlet and outlet openings in submerged communication with said liquid, two of said tubes having self-acting valves in their submerged ends, the inlet opening of one valve and the outlet opening of the other valve having the same capacity of flow, whereby the free pulsations, the mean average, the maximum and the minimum variations of the pressure to be determined, are indicated substantially as described.

2. A pressure gage consisting of a reservoir for containing a liquid and connected with the pressure to be indicated, a tube having a uniform bore for free inflow and outflow, another tube having a minute inlet in proportion to its bore, for a retarded inflow and outflow, a third tube controlled by a self-acting valve allowing a free ingress and a retarded egress and a fourth tube controlled by a self-acting valve allowing a retarded inflow and a free outflow, and a graduated scale, the inlet ends of said tubes and their contained selfacting valves being submerged in said liquid whereby each tube is caused to give at the same time a different indication under the same pressure for the desired comparison.

3. In a manometer or pressure gage, a reservoir for containing a liquid and connected with the pressure to be indicated, in combination with a gage tube and a hollow valve within the bore of said tube having a minute top opening for a retarded inflow into the gage-tube the bottom of said valve being unobstructed for the free inflow of the liquid therein, the said tube having its pressure communicating end and its contained valve submerged in said liquid for operation in the way and for the purpose set forth.

4. A pressure-gage, consisting of a reservoir for containing a liquid and connected with the pressure to be indicated, three tubes, one 4, opening downward into said liquid and having a self-acting valve allowing a retarded ingress of the liquid into said tube and a free outflow therefrom, another tube 3, opening upward into said liquid and having a self acting valve allowing a retarded egress of the liquid from said tube and a free ingress therein, the third tube having an inlet minute in proportion to its bore allowing a retarded inflow and outflow, for the purpose stated.

5. In a manometer or pressure gage, a reservoir for containing the indicating liquid and connected with the pressure to be indicated, in combination with a gage-tube opening upward in said liquid and a self-acting valve seated in the submerged end of said tube and having its upper opening minute relatively to its lower open end and having intermediate wall openings for free inlet communication with said tube, substantially as described.

6. A manometer for determining the pulsations, mean average, maximum and minimum variations of pressure, comprising a reservoir containing the indicating liquid and connected with the pressure to be indicated, a plurality of tubes dipping into said liquid and having differential inlet and outlet openings, one of said tubes having a return-bend so as to open upward and having a valve adapted to give a free ingress and a retarded egress of the liquid and another of said tubes opening downward and having a valve adapted to give a free egress and retarded ingress of the liquid in the way and for the purpose stated.

7. In a pressure-gage, a tube having its inlet end immersed in the indicating liquid and a hollow valve self acting within the immersed end of the tube and open at both ends, the opening at its lower end being unobstructed and relatively larger than the top opening, the inflow into the tube being through the large open bottom of the valve, and the outflow from said tube through the relatively large and small openings of said valve, substantially as described.

8. In a manometer, a tube open at its lower end and at its sides and formed with a seat above and below its side openings, in combination with a hollow valve open at both ends, controlled between the said tube-seats and having its upper opening minute relatively to its lower opening, and a reservoir for containing the indicating medium with which the said tube, by its side openings has communication above the valve and by its bottom opening below the valve in the way and for the purpose stated.

9. A pressure-gage consisting of two tubes, one opening downward, the other opening upward, the tube opening downward having side openings and a self-acting valve having a minute inlet, the tube opening upward having a valve provided with side openings and a minute outlet, the said valves being hollow, open and unobstructed at their lower ends and submerged in the pressure indicating liquid, and the said tubes formed with seats for both ends of said valves and enlarged circumferentially between the valve seats, whereby the outflow is over and around the valve of one tube and through the valve of the other tube, for the purpose stated.

10. In a manometer or pressure-gage, a reservoir for containing the pressure indicating liquid, having in its top-plate a series of tapering openings and connected to the pressure to be indicated, in combination with an elastic plug for each opening having a tapering circumference and a uniform bore and projecting above said reservoir, a gage-tube entering the reservoir through each plug, a cap-plate apertured to receive the several gage-tubes seated upon all the plugs and clamp-screws passing through said cap-plate and engaging the reservoir, whereby the several tubes are sealed and secured in their proper relation to each other within the reservoir.

11. In a manometer or pressure-gage, the combination of a tube having its inlet end standing downward and a tube having its inlet end standing upward, each tube having a hollow valve open at both ends, the inlet opening in one valve being minute to cause a retarded inflow into the tube, the outflow from the tube being free over said valve, the outflow opening of the other valve being minute to cause a retarded outflow from the tube, the inflow to the tube being free, and a reservoir for containing the indicating liquid connected with the pressure to be indicated and into which the valved ends of the tubes are immersed, whereby the valved tube having its retarding inlet opening standing upward serves to indicate the average maximum pressure of the pulsations and the valved tube having its retarding inlet opening standing downward serves to indicate the average minimum pressure of the pulsations.

12. A manometer or pressure-gage, comprising a reservoir for containing the indicating liquid, a series of four gage tubes having differential inlet and outlet openings in submerged communication with said liquid, the inlet and the outlet of two of said tubes being controlled by self-acting valves, each having a large opening at its lower end and a minute opening at its upper end and all of said tubes at their upper ends in free communication with the air.

EDWARD A. UEHLING.

In presence of—
J. M. PICKENS,
W. A. MAJOR.